(12) United States Patent
Gairdner

(10) Patent No.: US 6,592,658 B1
(45) Date of Patent: Jul. 15, 2003

(54) CONCRETE REMOVING COMPOSITION

(75) Inventor: John Gairdner, Auckland (NZ)

(73) Assignee: Commodore International Limited, Auckland (NZ)

( * ) Notice: Subject to any disclaimer, the term of this patent is extended or adjusted under 35 U.S.C. 154(b) by 0 days.

(21) Appl. No.: 09/856,550

(22) PCT Filed: Nov. 24, 1999

(86) PCT No.: PCT/NZ99/00202

§ 371 (c)(1),
(2), (4) Date: May 23, 2001

(87) PCT Pub. No.: WO00/30820

PCT Pub. Date: Jun. 2, 2000

(30) Foreign Application Priority Data

Nov. 24, 1998 (NZ) .............................................. 333041

(51) Int. Cl.[7] .................................................. C08L 5/00
(52) U.S. Cl. ................................ 106/205.71; 106/205.7
(58) Field of Search ........................ 106/205.71, 205.7; 134/42

(56) References Cited

U.S. PATENT DOCUMENTS

| | | |
|---|---|---|
| 4,050,943 A | 9/1977 | Sondhe |
| 4,162,172 A | 7/1979 | Longo |
| 4,855,069 A | 8/1989 | Schuppiser et al. |
| 5,653,917 A | 8/1997 | Singerman |
| 5,698,182 A | * 12/1997 | Prencipe et al. ............... 424/49 |

FOREIGN PATENT DOCUMENTS

| | | |
|---|---|---|
| GB | 2080812 A | 2/1982 |
| JP | 59-121177 A | 7/1984 |
| JP | 59-156950 A | 9/1984 |

* cited by examiner

Primary Examiner—Elizabeth D. Wood
(74) Attorney, Agent, or Firm—Young & Thompson

(57) ABSTRACT

A composition and method for removing hardened or semi-hardened cementitious substances such as concrete, plaster, mortar, grout and similar substances from surfaces such as exterior and interior building surfaces and exterior surfaces of automobiles. The composition includes anhydrous citric acid as an ingredient together with a thickening or viscosity building agent and a wetting agent. The composition is inherently non-aggressive and environmentally friendly. Therefore, the composition is not hazardous to users and is unlikely to damage surfaces from which the cementitious substance is to be removed.

19 Claims, No Drawings

CONCRETE REMOVING COMPOSITION

FIELD OF THE INVENTION

This invention relates to compositions and methods for removing hardened or semi-hardened cementitious substances such as concrete, paster, grout, mortar and similar substances from surfaces.

BACKGROUND

There is a significant problem, particularly in the construction industry, with concrete being inadvertently poured or splashed across surfaces on which is desired that concrete not be applied. When the concrete is still soft it is relatively easy matter to simply wash away the concrete with water. However, frequently concrete splashes occur in situations where the concrete cannot be immediately removed or is not noticed for some time. In these cases, the concrete hardens and can be very difficult to remove. Also, removing such hardened concrete can cause damage to the surface from which the concrete is removed.

Similar problems can also occur when plastering either internal or external building surfaces or when working with grout, mortar and similar substances.

Known removal compositions and methods include the use of strong inorganic adds which attack concrete when applied directly on to the concrete and allow the concrete to be removed, for example by being washed away with water flowing from a hose.

Such known compositions have significant disadvantages. The major disadvantage is that the use of strong inorganic acids is unfriendly to the environment. Although these substances can be very effective in removing concrete, they produce residual substances which are biologically toxic and which are therefore undesirable.

The other significant disadvantage with the known compositions is that the inorganic, acids are strong acids and pose a significant risk of damage of the surface upon which the concrete is disposed. For example, surfaces from which concrete is designed to be removed are usually surfaces of buildings including exterior cladding and paint work, windows and window frames. Other surfaces include the exterior surfaces of private vehicles such as automobiles which are parked in the vicinity of a construction site and which get sprayed with concrete inadvertently during a construction operation. These surfaces are obviously sensitive and are easily damaged by strong acids.

SUMMARY OF THE INVENTION

It is an object of the present invention to provide compositions or methods for removing cementitious substances which will at least go some way toward overcoming the foregoing disadvantages, or which will at least provide the public with a useful choice.

Accordingly, in one aspect the Invention may broadly be said to consist in a composition for removing a cementitious substance from a surface, the composition including citric acid, and an organic thickening agent.

In a further aspect the invention may broadly be said to consist in method for removing a cementitious substance from a surface, the method comprising the steps of applying a composition of citric acid and an organic thickening agent to the concrete, allowing the composition to remain in contact with the concrete until such time as the concrete has been substantially transformed to a state whereby it may be removed from the surface, and removing the transformed concrete from the surface or allowing the transformed concrete to fall away from the surface.

DESCRIPTION OF PREFERRED EMBODIMENT

The present invention provides a composition and related method for removing hardened or semi-hardened cementitious substances from a surface. The term cementitious substances is used herein to refer to substances that include cement or substances that have the properties of cement such as concrete, plaster, grout, mortar and similar substances including those that have hydrated lime as an ingredient and/or calcium sulphate.

The composition of the present invention includes a specific organic acid (e.g. anhydrous citric acid) in combination with a organic, preferably vegetable based, viscosity builder which is not affected by the acid (e.g. Xanthan).

In the process of the present invention, the composition is applied as a solution to the hardened or semi-hardened cementitious substance such as concrete or plaster. The solution is permitted to work until the concrete or plaster matrix loses its cohesiveness, that is to say until the concrete or plaster matrix has been reduced to its component solids and calcium citrate. The solution may thus be continuously applied until all the concrete or plaster on the surface has lost its cohesiveness. The remaining solids and calcium citrate either fall off the surface under the influence of gravity or may be removed from the surface by spring with water for example, or by otherwise removing, for example scraping, sponging, or mopping.

We have found that the use of anhydrous citric acid has the significant advantage that the acid is an organic acid and is relatively "gentle". We have found that there are very few substances which have the properties of anhydrous citric add and which can still be economically used for an application such as the non-hazardous removal of concrete or plaster.

The anhydrous citric acid in use reacts with the hydrated lime used in many cementitious substances such as concrete as a hardener and creates calcium citrate as the residual end substance. Calcium citrate has the advantage that it is biologically available and therefore does not harm environmental microorganisms.

We have found that a concentration range of approximately 25% to 75% anhydrous citric acid in the composition is broadly effective in use.

In use, The composition is applied by spraying, brushing or sponging onto the cementitious substance such as concrete or plaster that needs to be removed. Frequently, the concrete or plaster is located on surfaces such as walls or the sides of vehicles, so that the solution must be of an appropriate viscosity or "thickness" to prevent it from immediately draining away from the wall or surface so that the chemical reaction has an opportunity to take place. In order to ensure that biologically available end substances remain, we have used an organic vegetable based substance as a viscosity builder or thickener. We have found that Xanthan has the particular advantage that it is not affected by pH, so can be used with anhydrous civic acid and still retain its properties of increasing the viscosity of the solution.

Thickening or viscosity building substances other than Xanthan may be used, but we have found Xanthan to be the most suitable. Other substances that may be used include celluloses such as methyl cellulose and caboxymethyl celluloses. These have the disadvantage that they tend to be stable in only a very narrow portion of the pH spectrum.

Another preferred ingredient in the composition is a wetting agent to assist with pension of the concrete or plaster. A number of wetting agents may be used, but those that have low toxicity are preferred. We have found that triethanolamine taurylsulphate performs well. This substance is non-toxic and non-hazardous.

Other wetting agents that may be used include copolymer types. These suffer the disadvantage of being more expensive. Other options include sulphestol (sold under the trade mark TEEPOL).

A further ingredient that may be added to the composition is one or more aromatic essential oils, preferably in the amount of approximately 0.01%. The addition of such oils gives a slightly pearlised effect to the composition in use and adds a faint tinge of aroma. These aspects are both attractive to users of such compositions, particularly if concrete needs to be removed from objects such as private vehicles.

Another ingredient in the composition, particularly when cleaning vehicles and other objects having surfaces where aesthetic appearance is very desirable, may be an optical brightener. This ingredient provides a desirable clean, clear finish.

One example of a suitable composition according to the present invention comprises a solution of approximately 60% anhydrous citric acid, approximately 0.01% Xanthan, approximately 0.1% triethanolamine laurysulphate, and water as the remainder of the solution.

Another example of a suitable composition according to the present invention comprises a solution of approximately 60% anhydrous citric acid, approximately 0.01% Xanthan, approximately 0.1% triethanolamine laurysulphate, approximately 0.01% of one or more aromatic essential oils and water as the remainder of the solution.

Another example of a suitable composition according to the present invention comprises a solution of approximately 60% anhydrous citric acid, approximately 0.01% Xanthan, approximately 0.1% triethanolamine laurylsulphate, approximately 0.01% of one or more aromatic essential oils, approximately 0.1% optical brightener and water as the remainder of the solution.

We have found that the above solutions are effective in removing hardened or semi-hardened concrete or plaster from surfaces without significant damage to the surface itself.

Our tests have established that the above solutions are harmless to surfaces including painted surfaces, traditional architectural and automotive coatings, anodised or powder coated surfaces, ceramic and terracotta surfaces, and brick and glazing. The above solutions may be inappropriate for use on marble, limestone and unprotected cement fibreboard, but are otherwise generally non-aggressive.

The non-aggressive properties of the above solutions also have the advantage of being non-hazardous to persons using the solutions. For example, the solutions can be splashed on the skin of an operator without harm and can even be consumed by a human being without significant harm.

The solutions have the significant advantages that they can be sold in standard plastic containers of varying sizes, it can be safely handled by humans without risk and it can also be safely stored. Biologically friendly end substances are produced by use of the solution to remove concrete, and Xanthan is a naturally occurring substance.

What is claimed is:

1. A composition for removing a hardened or semi-hardened cementitious substance including hydrated lime or calcium sulphate from a surface, the composition including approximately 25% to 75% anhydrous citric acid and an organic thickening agent.

2. A composition according to claim 1, comprising approximately 60% anhydrous citric acid.

3. A composition according to claim 1, wherein the thickening agent comprises approximately 0.01% of the composition.

4. A composition according to claim 3, wherein the thickening agent comprises Xanthan.

5. A composition according to claim 1, including approximately 0.1% of a wetting agent.

6. A composition according to claim 1, wherein the remainder of the composition substantially comprises water.

7. A composition according to claim 1, wherein the composition contains one or more aromatic essential oils.

8. A composition according to claim 7, wherein the composition contains approximately 0.01% of one or more aromatic essential oils.

9. A composition for removing a hardened or semi-hardened cementitious substance including hydrated lime or calcium sulphate from a surface, the composition consisting essentially of about 25% to 75% anhydrous citric acid, and Xanthan as a thickening agent, balance essentially water.

10. A method for removing a hardened or semi-hardened cementitious substance including hydrated lime or calcium sulphate from a surface, the method comprising the steps of:

applying a composition of approximately 25% to 75% anhydrous citric acid and an organic thickening agent to the substance;

allowing the composition to remain in contact with the substance until such time as the substance has been substantially transformed to a state whereby it may be removed from the surface; and removing the transformed substance from the surface or allowing the transformed substance to fall away from the surface.

11. A method according to claim 10, wherein the composition comprises approximately 60% anhydrous citric acid.

12. A method according to claim 10, wherein the thickening agent comprises approximately 0.01% of the composition.

13. A method according to claim 12, wherein the thickening agent comprises Xanthan.

14. A method according to claim 10, wherein the composition includes approximately 0.1% of a wetting agent.

15. A method according to claim 10, wherein the remainder of the composition substantially comprises water.

16. A method according to claim 10, wherein the composition contains one or more aromatic essential oils.

17. A method according to claim 16, wherein the composition contains approximately 0.01% of one or more aromatic essential oils.

18. A method according to claim 10, wherein removal of the transformed material is by flushing, sponging or scraping.

19. A method according to claim 10, wherein said composition consists essentially of about 25% to 75% anhydrous citric acid and said organic thickening agent is Xanthan, balance essentially water.

* * * * *